(12) United States Patent
Jacob

(10) Patent No.: US 8,431,065 B2
(45) Date of Patent: *Apr. 30, 2013

(54) POLYOLEFIN-BASED CROSSLINKED ARTICLES

(75) Inventor: Sunny Jacob, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,833

(22) Filed: Apr. 13, 2012

(65) Prior Publication Data

US 2012/0220682 A1 Aug. 30, 2012

Related U.S. Application Data

(62) Division of application No. 12/960,201, filed on Dec. 3, 2010, now Pat. No. 8,178,031, which is a division of application No. 12/130,745, filed on May 30, 2008, now Pat. No. 7,867,433.

(51) Int. Cl.
*H01J 37/30* (2006.01)
*B29C 47/00* (2006.01)
*C08G 18/32* (2006.01)
*C08J 3/28* (2006.01)

(52) U.S. Cl.
USPC .......... 264/470; 264/477; 522/110; 522/117; 522/121; 522/125

(58) Field of Classification Search .................. 264/470, 264/477; 522/121, 125, 117, 110
See application file for complete search history.

(56) References Cited

U.S. PATENT DOCUMENTS

| | | | |
|---|---|---|---|
| 4,049,757 A | 9/1977 | Kammel et al. | |
| 4,367,185 A | 1/1983 | Nojiri et al. | |
| 4,540,753 A | 9/1985 | Cozewith et al. | |
| 5,000,899 A | 3/1991 | Dreibelbis et al. | |
| 5,560,886 A | 10/1996 | Saito et al. | |
| 6,268,438 B1 | 7/2001 | Ellul et al. | |
| 6,342,565 B1 | 1/2002 | Cheng et al. | |
| 6,488,882 B2 | 12/2002 | Lau et al. | |
| 6,500,563 B1 | 12/2002 | Datta et al. | |
| 6,525,157 B2 | 2/2003 | Cozewith et al. | |
| 6,544,643 B1 * | 4/2003 | Hyde et al. | 428/355 EN |
| 6,548,600 B2 | 4/2003 | Walton | |
| 6,559,262 B1 | 5/2003 | Waymouth et al. | |
| 6,569,915 B1 | 5/2003 | Jackson et al. | |
| 6,642,316 B1 | 11/2003 | Datta et al. | |
| 6,667,364 B2 | 12/2003 | Abraham et al. | |
| 6,770,713 B2 | 8/2004 | Hanke et al. | |
| 6,881,800 B2 | 4/2005 | Friedersdorf | |
| 6,890,990 B2 | 5/2005 | Cai et al. | |
| 7,232,871 B2 | 6/2007 | Datta et al. | |
| 7,271,209 B2 | 9/2007 | Li et al. | |
| 7,390,866 B2 | 6/2008 | Datta et al. | |
| 7,464,696 B2 | 12/2008 | Furusawa et al. | |
| 7,605,217 B2 | 10/2009 | Datta et al. | |
| 7,619,026 B2 | 11/2009 | Yang et al. | |
| 7,645,415 B2 | 1/2010 | Hach | |
| 7,863,364 B2 | 1/2011 | Westwood et al. | |
| 7,867,433 B2 | 1/2011 | Jacob et al. | |
| 7,872,075 B2 | 1/2011 | Ellul et al. | |
| 8,013,093 B2 | 9/2011 | Datta et al. | |
| 8,026,309 B2 * | 9/2011 | Halahmi et al. | 525/66 |
| 8,202,467 B2 * | 6/2012 | Sahnoune et al. | 264/470 |
| 2005/0107530 A1 | 5/2005 | Datta et al. | |
| 2005/0107534 A1 | 5/2005 | Datta et al. | |
| 2005/0131142 A1 | 6/2005 | Datta et al. | |
| 2005/0215964 A1 | 9/2005 | Autran et al. | |
| 2006/0183861 A1 | 8/2006 | Harrington et al. | |
| 2006/0293461 A1 | 12/2006 | Jiang et al. | |
| 2007/0129493 A1 | 6/2007 | Sahnoune et al. | |
| 2007/0167553 A1 | 7/2007 | Westwood et al. | |
| 2008/0032079 A1 | 2/2008 | Sahnoune et al. | |
| 2008/0033107 A1 | 2/2008 | Wouters et al. | |
| 2008/0188600 A1 | 8/2008 | Westwood et al. | |
| 2009/0163642 A1 | 6/2009 | Kiss et al. | |

FOREIGN PATENT DOCUMENTS

| | | |
|---|---|---|
| EP | 0 374 695 | 6/1990 |
| EP | 0 946 640 | 10/1999 |
| EP | 0 969 043 | 1/2000 |
| EP | 1 003 814 | 5/2000 |
| EP | 1 017 729 | 7/2000 |
| EP | 1 070 087 | 1/2001 |
| EP | 1 223 191 | 7/2002 |
| EP | 1 614 699 | 1/2006 |
| EP | 1 634 919 | 3/2006 |
| WO | WO 98/31283 | 7/1998 |
| WO | WO 00/01766 | 1/2000 |
| WO | WO 00/69963 | 11/2000 |
| WO | WO 02/36651 | 5/2002 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/014988 | 2/2004 |
| WO | WO 2005/049672 | 6/2005 |
| WO | WO 2006/102149 | 9/2006 |

OTHER PUBLICATIONS

Subramanium, A., "*Natural Rubber*", Rubber Technology 1995, pp. 179-208.
Ver Strate et al., "*Near Monodisperse Ethylene-Propylene Copolymers by Direct Ziegler-Natta Polymerization. Preparation, Characterization, Properties*", Macromolecules, 1998, vol. 21, pp. 3360-3371.

* cited by examiner

*Primary Examiner* — Nathan M Nutter

(57) ABSTRACT

Methods for making a crosslinked elastomeric composition and articles made of the same are provided. In at least one specific embodiment, an elastomeric composition comprising at least one propylene-based polymer is blended with at least one component selected from the group consisting of multifunctional acrylates, multifunctional methacrylates, functionalized polybutadiene resins, functionalized cyanurate, and allyl isocyanurate; and blended with at least one component selected from the group consisting of hindered phenols, phosphites, and hindered amines. The propylene-based polymer can include propylene derived units and one or more dienes, and have a triad tacticity of from 50% to 99% and a heat of fusion of less than 80 J/g. The blended composition can then be extruded and crosslinked. The extruded polymer can be crosslinked using electron beam radiation having an e-beam dose of about 100 KGy or less. The crosslinked polymers are particularly useful for making fibers and films.

13 Claims, No Drawings

POLYOLEFIN-BASED CROSSLINKED ARTICLES

CROSS-REFERENCE TO RELATED APPLICATIONS

This application is a divisional of and claims priority to U.S. patent application Ser. No. 12/960,201, filed Dec. 3, 2010 now U.S. Pat. No. 8,178,031, which is a divisional of U.S. patent application Ser. No. 12/130,745 filed May 30, 2008, now U.S. Pat. No. 7,867,433, granted Jan. 11, 2011, the disclosure of which is herein incorporated by reference in its entirety.

FIELD OF INVENTION

Embodiments of the present invention relate to crosslinked elastomeric compositions, articles, and methods for making same. More particularly, embodiments of the present invention relate to fibers and films produced from crosslinked propylene-based polymers.

BACKGROUND

Materials with good stretchability and elasticity are used to manufacture a variety of disposable articles in addition to durable articles including incontinence pads, disposable diapers, training pants, clothing, undergarments, sports apparel, automotive trim, weather-stripping, gaskets, and furniture upholstery. For clothing, stretchability and elasticity are performance attributes that allow the materials to provide a closely conforming fit to the body of the wearer.

While numerous materials are known to exhibit excellent stress-strain properties and elasticity at room temperatures, it is often desirable for elastic materials to provide a conforming or secure fit during repeated use, during extensions and retractions at elevated or depressed temperatures, or in automobile interiors during summer months. Elasticity at elevated temperatures is also important for maintaining tight tolerances throughout temperature cycles. In particular, elastic materials used for repeated wear clothing or garments must maintain their integrity and elastic performance after laundering.

Spandex™, a segmented polyurethane urea elastic material, is currently used in various durable fabrics. For example, fibers made from Spandex™ have been used in launderable apparels, fabrics, durable and disposable furnishing, beddings, etc. Similar to conventional uncrosslinked polyolefin-based elastic materials, articles made from Spandex™ can lose integrity, shape, and elastic properties when subjected to elevated temperatures. Thus, Spandex™ is not suitable for many co-knitting applications with high temperature fibers, such as polyester fibers.

Propylene-based polymers having good elastic properties are known and have been used for stretchable clothing. See, for example, U.S. Pat. No. 6,525,157 and U.S. Pat. No. 6,342,565. U.S. Pat. No. 6,342,565, in particular, discloses a soft, set-resistant, annealed fiber comprising a blend of polyolefins. The blend has a flexural modulus less than or equal to 12,000 psi and includes from 75 to 98 wt % of a first polymer component and from 2 to 25 wt % of a second polymer component. The first polymer component is a propylene-ethylene polymer having at least 80 wt % propylene and up to 20 wt % ethylene, a melting point by DSC in the range of from 25 to 70° C., and a heat of fusion less than 25 J/g. The second polymer component is a stereoregular isotactic polypropylene having a melting point by DSC of greater than 130° C., and a heat of fusion greater than 120 J/g. The fiber exhibits a resistance to set equal to or less than 80% from a 400% tensile deformation. The polyolefin blend is said to be substantially non-crosslinked.

U.S. Pat. No. 6,500,563 discloses blends of two different types of polypropylene, including blends made from a polypropylene having a Tm of less than 110° C. and propylene-ethylene copolymer that has isotactically arranged propylene derived sequences and Tm less than 105° C.

Three component blends of isotactic polypropylene, impact modifying amounts of an ethylene-propylene based rubber or low density ethylene copolymer and a propylene-based elastomer as compatibilizer are described in EP946640, EP964641, EP969043 and EP1098934.

WO04/014988 describes blends of isotactic polypropylene with non-functionalized plasticizers such as poly-alpha-olefins. WO03/040233 also discloses two component blends with the isotactic polypropylene as the predominant, matrix phase and the propylene-based copolymer serving as an impact modifier.

EP1003814 and U.S. Pat. No. 6,642,316 disclose two-component blends of small amounts of isotactic polypropylene and predominant amounts of an ethylene based elastomer. EP0374695 discloses visually homogeneous two component blends however using 40 wt % or less of the propylene-based copolymer. WO 00/69963 describes films made of two-component blends with from 75 to 98 wt % of a propylene ethylene based elastomer having a heat of fusion of less than 25 J/g.

Other related references include US Publication Numbers 2006/102149US 2005/0107529; 2005/0107530; 2005/0131142; and 2005/0107534.

There is still a need for new and improved propylene-based materials requiring good stretchability and elasticity.

SUMMARY OF THE INVENTION

Methods for making a crosslinked elastomeric composition and articles made of the same are provided. The crosslinked elastomeric composition can be made from blending one or more propylene-based polymers, one or more antioxidants, and one or more co-agents that when crosslinked, surprisingly and unexpectedly exhibits little to no loss in tensile strength. In fact, the tensile strength of the crosslinked composition surprisingly and unexpectedly improves. Furthermore, the crosslinked composition surprisingly and unexpectedly exhibits excellent set properties for making fibers and films among other articles. The elastomeric composition can optionally include one or more polyolefinic thermoplastic resins and/or optionally one or more secondary elastomeric components.

In at least one specific embodiment, an elastomeric composition comprising at least one propylene-based polymer is blended with at least one component selected from the group consisting of multifunctional acrylates, multifunctional methacrylates, functionalized polybutadiene resins, functionalized cyanurate, and allyl isocyanurate; and at least one component selected from the group consisting of hindered phenols, phosphites, and hindered amines. The propylene-based polymer can include propylene derived units and one or more dienes, and have a triad tacticity of from 50% to 99% and a heat of fusion of less than 80 J/g. The blended composition can then be extruded and crosslinked. The extruded polymer can be crosslinked using electron beam radiation having an e-beam dose of about 200 kGy or less.

In at least one other specific embodiment, at least one propylene-based polymer comprising propylene derived units and one or more dienes, the propylene-based polymer having a triad tacticity of from 50% to 99% and a heat of fusion of less than 80 J/g is blended with one or more polyolefinic thermoplastic components; at least one component selected from the group consisting of multifunctional acrylates, multifunctional methacrylates, functionalized polybutadiene resins, functionalized cyanurate, and allyl isocyanurate; and at least one component selected from the group consisting of hindered phenols, phosphites, and hindered amines. The blended composition can be extruded and crosslinked. The extruded polymer can be crosslinked using electron beam radiation having an e-beam dose of about 200 kGgy or less.

In at least one other specific embodiment, a method for making a crosslinked elastomeric article comprises blending an elastomeric composition comprising: at least one propylene-based polymer comprising propylene derived units and one or more dienes, the propylene-based polymer having a triad tacticity of from 50% to 99% and a heat of fusion of less than 80 J/g; at least one component selected from the group consisting of multifunctional acrylates, multifunctional methacrylates, functionalized polybutadiene resins, functionalized cyanurate, and allyl isocyanurate; and at least one component comprising trimethylolpropane trimethacrylate. The blended composition can be extruded and crosslinked. The extruded polymer can be crosslinked using electron beam radiation having an e-beam dose of about 200 kGgy or less.

In at least one other specific embodiment, the crosslinked elastomeric composition includes at least one propylene-based polymer comprising propylene derived units and one or more dienes, the propylene-based polymer having a triad tacticity of from 50% to 99% and a heat of fusion of less than 80 J/g; at least one component selected from the group consisting of multifunctional acrylates, multifunctional methacrylates, functionalized polybutadiene resins, functionalized cyanurate, and allyl isocyanurate; at least one component comprising trimethylolpropane trimethacrylate; one or more polyolefinic thermoplastic components; and optionally one or more secondary elastomeric components, wherein the crosslinked polypropylene has great than 50% xylene insolubles as measured according to ASTM-D 5492.

The crosslinked elastomeric compositions are particularly useful for making fibers and films.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Propylene-Based Polymer

The propylene-based polymer can be one or more propylene-α-olefin-diene terpolymers or propylene-diene copolymers. For simplicity and ease of description, however, the terms "propylene-based polymer" and "propylene copolymer" and "PCP" as used herein will refer to both propylene-α-olefin-diene terpolymers and propylene-diene copolymers.

In at least one specific embodiment, the propylene-based polymer can be prepared by polymerizing propylene with one or more dienes. In at least one other specific embodiment, the propylene-based polymer can be prepared by polymerizing propylene with ethylene and/or at least one $C_4$-$C_{20}$ α-olefin, or a combination of ethylene and at least one $C_4$-$C_{20}$ α-olefin and one or more dienes. The one or more dienes can be conjugated or non-conjugated. Preferably, the one or more dienes are non-conjugated.

The comonomers can be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomer can include styrene.

Illustrative dienes can include but are not limited to 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD), and combinations thereof. Preferably, the diene is ENB.

Preferred methods and catalysts for producing the propylene-based polymers are found in publications US 2004/0236042 and WO 05/049672 and in U.S. Pat. No. 6,881,800, which are all incorporated by reference herein. Pyridine amine complexes, such as those described in WO03/040201 are also useful to produce the propylene-based polymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion, see Rieger EP1070087. The catalyst described in EP1614699 could also be used for the production of backbones suitable for the invention.

The propylene-based polymer can have an average propylene content on a weight percent basis of from about 60 wt % to about 99.7 wt %, more preferably from about 60 wt % to about 99.5 wt %, more preferably from about 60 wt % to about 97 wt %, more preferably from about 60 wt % to about 95 wt % based on the weight of the polymer. In one embodiment, the balance comprises diene. In another embodiment, the balance comprises one or more dienes and one or more of the α-olefins described previously. Other preferred ranges are from about 80 wt % to about 95 wt % propylene, more preferably from about 83 wt % to about 95 wt % propylene, more preferably from about 84 wt % to about 95 wt % propylene, and more preferably from about 84 wt % to about 94 wt % propylene based on the weight of the polymer. The balance of the propylene-based polymer comprises a diene and optionally, one or more alpha-olefins. In one or more embodiments above or elsewhere herein, the alpha-olefin is ethylene, butene, hexene or octene. In other embodiments, two alpha-olefins are present, preferably ethylene and one of butene, hexene or octene.

Preferably, the propylene-based polymer comprises about 0.2 wt % to about 24 wt %, of a non-conjugated diene based on the weight of the polymer, more preferably from about 0.5 wt % to about 12 wt %, more preferably about 0.6 wt % to about 8 wt %, and more preferably about 0.7 wt % to about 5 wt %. In other embodiments, the diene content ranges from about 0.2 wt % to about 10 wt %, more preferably from about 0.2 to about 5 wt %, more preferably from about 0.2 wt % to about 4 wt %, preferably from about 0.2 wt % to about 3.5 wt %, preferably from about 0.2 wt % to about 3.0 wt %, and preferably from about 0.2 wt % to about 2.5 wt % based on the weight of the polymer. In one or more embodiments above or elsewhere herein, the propylene-based polymer comprises ENB in an amount of from about 0.5 to about 4 wt %, more preferably from about 0.5 to about 2.5 wt %, and more preferably from about 0.5 to about 2.0 wt %.

In other embodiments, the propylene-based polymer preferably comprises propylene and diene in one or more of the ranges described above with the balance comprising one or more $C_2$ and/or $C_4$-$C_{20}$ olefins. In general, this will amount to the propylene-based polymer preferably comprising from about 5 to about 40 wt % of one or more $C_2$ and/or $C_4$-$C_{20}$ olefins based the weight of the polymer. When $C_2$ and/or a $C_4$-$C_{20}$ olefins are present the combined amounts of these olefins in the polymer is preferably at least about 5 wt % and falling within the ranges described herein. Other preferred ranges for the one or more α-olefins include from about 5 wt % to about 35 wt %, more preferably from about 5 wt % to about 30 wt %, more preferably from about 5 wt % to about 25 wt %, more preferably from about 5 wt % to about 20 wt %, more preferably from about 5 to about 17 wt % and more preferably from about 5 wt % to about 16 wt %.

The propylene-based polymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D as described herein.

In one or more embodiments above or elsewhere herein, the propylene-based polymer can have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 400,000, wherein Mw is determined as described herein.

In one or more embodiments above or elsewhere herein, the propylene-based polymer can have a Mn of about 2,500 to about 2,500,000 g/mole, more preferably a Mn of about 5,000 to about 500,000, more preferably a Mn of about 10,000 to about 250,000, more preferably a Mn of about 25,000 to about 200,000, wherein Mn is determined as described herein.

In one or more embodiments above or elsewhere herein, the propylene-based polymer can have a Mz of about 10,000 to about 7,000,000 g/mole, more preferably a Mz of about 50,000 to about 1,000,000, more preferably a Mz of about 80,000 to about 700,000, more preferably a Mz of about 100,000 to about 500,000, wherein Mz is determined as described herein.

The molecular weight distribution index (MWD=(Mw/Mn)), sometimes referred to as a "polydispersity index" (PDI), of the propylene-based polymer can be about 1.5 to 40. In an embodiment the MWD can have an upper limit of 40, or 20, or 10, or 5, or 4.5, and a lower limit of 1.5, or 1.8, or 2.0. In one or more embodiments above or elsewhere herein, the MWD of the propylene-based polymer is about 1.8 to 5 and most preferably about 1.8 to 3. Techniques for determining the molecular weight (Mn and Mw) and molecular weight distribution (MWD) can be found in U.S. Pat. No. 4,540,753 (Cozewith, Ju and Verstrate) (which is incorporated by reference herein for purposes of U.S. practices) and references cited therein, in Macromolecules, 1988, volume 21, p 3360 (Verstrate et al.), which is herein incorporated by reference for purposes of U.S. practice, and references cited therein, and in accordance with the procedures disclosed in U.S. Pat. No. 6,525,157, column 5, lines 1-44, which patent is hereby incorporated by reference in its entirety.

In one or more embodiments above or elsewhere herein, the propylene-based polymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-based polymer and $\eta_l$ is the intrinsic viscosity of a linear polymer of the same viscosity-averaged molecular weight ($M_v$) as the propylene-based polymer. $\eta_l = KM_v^\alpha$, K and α were measured values for linear polymers and should be obtained on the same instrument as the one used for the g' index measurement.

In one or more embodiments above or elsewhere herein, the propylene-based polymer can have a density of about 0.85 g/cm$^3$ to about 0.92 g/cm$^3$, more preferably, about 0.87 g/cm$^3$ to 0.90 g/cm$^3$, more preferably about 0.88 g/cm$^3$ to about 0.89 g/cm$^3$ at room temperature as measured per the ASTM D-1505 test method.

In one or more embodiments above or elsewhere herein, the propylene-based polymer can have a melt flow rate (MFR, 2.16 kg weight @ 230° C.), equal to or greater than 0.2 g/10 min as measured according to the ASTM D-1238(A) test method as modified (described below). Preferably, the MFR (2.16 kg @ 230° C.) is from about 0.5 g/10 min to about 200 g/10 min and more preferably from about 1 g/10 min to about 100 g/10 min. In an embodiment, the propylene-based polymer has an MFR of 0.5 g/10 min to 200 g/10 min, especially from 2 g/10 min to 30 g/10 min, more preferably from 5 g/10 min to 30 g/10 min, more preferably 10 g/10 min to 30 g/10 min, more preferably 10 g/10 min to about 25 g/10 min, or more preferably 2 g/10 min to about 10 g/10 min.

The propylene-based polymer can have a Mooney viscosity ML (1+4)@125° C., as determined according to ASTM D1646, of less than 100, more preferably less than 75, even more preferably less than 60, most preferably less than 30.

In one or more embodiments above or elsewhere herein, the propylene-based polymer can have a heat of fusion (Hf) determined according to the DSC procedure described later, which is greater than or equal to about 0.5 Joules per gram (J/g), and is ≦about 80 J/g, preferably ≦about 75 J/g, preferably ≦about 70 J/g, more preferably ≦about 60 J/g, more preferably ≦about 50 J/g, more preferably ≦about 35 J/g. Also preferably, the propylene-based polymer has a heat of fusion that is greater than or equal to about 1 J/g, preferably greater than or equal to about 5 J/g. In another embodiment, the propylene-based polymer can have a heat of fusion (Hf), which is from about 0.5 J/g to about 75 J/g, preferably from about 1 J/g to about 75 J/g, more preferably from about 0.5 J/g to about 35 J/g. Preferred propylene-based polymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion ranges from a lower limit of 1.0 J/g, or 1.5 J/g, or 3.0 J/g, or 4.0

J/g, or 6.0 J/g, or 7.0 J/g, to an upper limit of 30 J/g, or 35 J/g, or 40 J/g, or 50 J/g or 60 J/g or 70 J/g, or 75 J/g, or 80 J/g.

The crystallinity of the propylene-based polymer can also be expressed in terms of percentage of crystallinity (i.e. % crystallinity). In one or more embodiments above or elsewhere herein, the propylene-based polymer has a % crystallinity of from 0.5% to 40%, preferably 1% to 30%, more preferably 5% to 25% wherein % crystallinity is determined according to the DSC procedure described below. In another embodiment, the propylene-based polymer preferably has a crystallinity of less than 40%, preferably about 0.25% to about 25%, more preferably from about 0.5% to about 22%, and most preferably from about 0.5% to about 20%. As disclosed above, the thermal energy for the highest order of polypropylene is estimated at 189 J/g (i.e., 100% crystallinity is equal to 209 J/g.).

In addition to this level of crystallinity, the propylene-based polymer preferably has a single broad melting transition. However, the propylene-based polymer can show secondary melting peaks adjacent to the principal peak, but for purposes herein, such secondary melting peaks are considered together as a single melting point, with the highest of these peaks (relative to baseline as described herein) being considered the melting point of the propylene-based polymer.

The propylene-based polymer preferably has a melting point (measured by DSC) of equal to or less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

The Differential Scanning calorimetry (DSC) procedure can be used to determine heat of fusion and melting temperature of the propylene-based polymer. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (23-25° C.) for about 8 days. At the end of this period, an about 15-20 mg disc is removed from the pressed pad using a punch die and is placed in a 10 microliter aluminum sample pan. The sample is placed in a Differential Scanning calorimeter (Perkin Elmer Pyris 1 Thermal Analysis System) and is cooled to about −100° C. The sample is heated at 10° C./min to attain a final temperature of about 165° C. The thermal output, recorded as the area under the melting peak of the sample, is a measure of the heat of fusion and can be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-based polymer can have a triad tacticity of three propylene units, as measured by $^{13}$C NMR of 75% or greater, 80% or greater, 82% or greater, 85% or greater, or 90% or greater. Preferred ranges include from about 50 to about 99%, more preferably from about 60 to about 99%, more preferably from about 75 to about 99% and more preferably from about 80 to about 99%; and in other embodiments from about 60 to about 97%. Triad tacticity is determined by the methods described in U.S. Patent Application Publication 20040236042.

In one or more embodiments above or elsewhere herein, the propylene-based polymer can be a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less.

In one or more embodiments above or elsewhere herein, the propylene-based polymer can include a blend of two propylene-based polymers differing in the olefin content, the diene content, or both.

In one or more embodiments above or elsewhere herein, the propylene-based polymer can include a propylene based elastomeric polymer produced by random polymerization processes leading to polymers having randomly distributed irregularities in stereoregular propylene propagation. This is in contrast to block copolymers in which constituent parts of the same polymer chains are separately and sequentially polymerized.

In another embodiment, the propylene-based polymers can include copolymers prepared according the procedures in WO 02/36651. Likewise, the propylene-based polymer can include polymers consistent with those described in WO 03/040201, WO 03/040202, WO 03/040095, WO 03/040201, WO 03/040233, and/or WO 03/040442. Additionally, the propylene-based polymer can include polymers consistent with those described in EP 1 233 191, and U.S. Pat. No. 6,525,157, along with suitable propylene homo- and copolymers described in U.S. Pat. No. 6,770,713 and U.S. Patent Application Publication 2005/215964, all of which are incorporated by reference. The propylene-based polymer can also include one or more polymers consistent with those described in EP 1 614 699 or EP 1 017 729.

Grafted (Functionalized) Backbone

In one or more embodiments, the propylene-based polymer can be grafted (i.e. "functionalized") using one or more grafting monomers. As used herein, the term "grafting" denotes covalent bonding of the grafting monomer to a polymer chain of the propylene-based polymer.

The grafting monomer can be or include at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

In one or more embodiments, the grafted propylene based polymer comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 1 to about 6 wt. %, preferably at least about 0.5 wt. % and highly preferably about 1.5 wt. %.

Styrene and derivatives thereof such as paramethyl styrene, or other higher alkyl substituted styrenes such as t-butyl styrene can be used as a charge transfer agent in presence of the grafting monomer to inhibit chain scissioning. This allows further minimization of the beta scission reaction and the production of a higher molecular weight grafted polymer (MFR=1.5).

Preparing Grafted Propylene-Based Polymers

The grafted propylene-based polymer can be prepared using conventional techniques. For example, the graft polymer can be prepared in solution, in a fluidized bed reactor, or by melt grafting. A preferred grafted polymer can be prepared by melt blending in a shear-imparting reactor, such as an extruder reactor. Single screw but preferably twin screw extruder reactors such as co-rotating intermeshing extruder or counter-rotating non-intermeshing extruders but also co-kneaders such as those sold by Buss are especially preferred.

In one or more embodiments, the grafted polymer can be prepared by melt blending the ungrafted propylene-based polymer with a free radical generating catalyst, such as a peroxide initiator, in the presence of the grafting monomer. The preferred sequence for the grafting reaction includes melting the propylene-based polymer, adding and dispersing the grafting monomer, introducing the peroxide and venting the unreacted monomer and by-products resulting from the peroxide decomposition. Other sequences can include feeding the monomers and the peroxide pre-dissolved in a solvent.

Illustrative peroxide initiator include but are not limited to: diacyl peroxides such as benzoyl peroxide; peroxyesters such as tert-butylperoxy benzoate, tert-butylperoxy acetate, OO-tert-butyl-O-(2-ethylhexyl)monoperoxy carbonate; peroxyketals such as n-butyl-4,4-di-(tert-butyl peroxy)valerate; and dialkyl peroxides such as 1,1-bis(tertbutylperoxy)cyclohexane, 1,1-bis(tert-butylperoxy)-3,3,5-trimethylcyclohexane, 2,2-bis(tert-butylperoxy)butane, dicumylperoxide, tert-butylcumylperoxide, Di-(2-tert-butylperoxy-isopropyl-(2)) benzene, di-tert-butylperoxide (DTBP), 2,5-dimethyl-2,5-di(tert-butylperoxy)hexane, 2,5-dimethyl-2,5-di(tert-butylperoxy)hexyne, 3,3,5,7,7-pentamethyl 1,2,4-trioxepane; and the like.

Polyolefinic Thermoplastic Resin

The term "polyolefinic thermoplastic resin" as used herein refers to any material that is not a "rubber" and that is a polymer or polymer blend having a melting point of 70° C. or more and considered by persons skilled in the art as being thermoplastic in nature, e.g., a polymer that softens when exposed to heat and returns to its original condition when cooled to room temperature. The polyolefinic thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the polyolefinic thermoplastic resin component is unvulcanized or non crosslinked.

In one or more embodiments, the polyolefinic thermoplastic resin contains polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or s syndiotactic sequences, or both. The polypropylene can also include essentially syndiotactic sequences such that the melting point of the polypropylene is above 110° C. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins. As noted elsewhere herein, certain polypropylenes have a high MFR (e.g., from a low of 10, or 15, or 20 g/10 min to a high of 25 to 30 g/10 min. Others have a lower MFR, e.g., "fractional" polypropylenes which have an MFR less than 1.0. Those with high MFR can be preferred for ease of processing or compounding.

In one or more embodiments, the polyolefinic thermoplastic resin is or includes isotactic polypropylene. Preferably, the polyolefinic thermoplastic resin contains one or more crystalline propylene homopolymers or copolymers of propylene having a melting temperature greater than 105° C. as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such polyolefinic thermoplastic resin and methods for making the same are described in U.S. Pat. No. 6,342,565.

The term "random polypropylene" as used herein broadly means a copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

In one or more embodiments, the random polypropylene has a 1% secant modulus of about 100 kPsi to about 200 kPsi, as measured according to ASTM D790A. In one or more embodiments, the 1% secant modulus can be 140 kPsi to 170 kPsi, as measured according to ASTM D790A. In one or more embodiments, the 1% secant modulus can be 140 kPsi to 160 kPsi, as measured according to ASTM D790A. In one or more embodiments, the 1% secant modulus can range from a low of about 100, 110, or 125 kPsi to a high of about 145, 160, or 175 kPsi, as measured according to ASTM D790A.

In one or more embodiments, the random polypropylene can have a density of about 0.85 to about 0.95 g/cc, as measured by ASTM D792. In one or more embodiments, the random polypropylene can have a density of about 0.89 g/cc to 0.92 g/cc, as measured by ASTM D792. In one or more embodiments, the density can range from a low of about 0.85, 0.87, or 0.89 g/cc to a high of about 0.90, 0.91, 0.92 g/cc, as measured by ASTM D792

Secondary Elastomeric Component

The elastomeric composition can optionally include one or more secondary elastomeric components. In at least one specific embodiment, the secondary elastomeric component can be or include one or more ethylene-propylene copolymers (EP). Preferably, the ethylene-propylene polymer (EP) is non-crystalline, e.g., atactic or amorphous, but in certain embodiments the EP may be crystalline (including "semi-crystalline"). The crystallinity of the EP is preferably derived from the ethylene, and a number of published methods, procedures and techniques are available for evaluating whether the crystallinity of a particular material is derived from ethylene. The crystallinity of the EP can be distinguished from the crystallinity of the propylene-based polymer by removing the EP from the composition and then measuring the crystallinity of the residual propylene-based polymer. Such crystallinity measured is usually calibrated using the crystallinity of polyethylene and related to the comonomer content. The percent crystallinity in such cases is measured as a percentage of polyethylene crystallinity and thus the origin of the crystallinity from ethylene is established.

In one or more embodiments, the EP can include one or more optional polyenes, including particularly a diene; thus, the EP can be an ethylene-propylene-diene (commonly called "EPDM"). The optional polyene is considered to be any hydrocarbon structure having at least two unsaturated bonds wherein at least one of the unsaturated bonds is readily incorporated into a polymer. The second bond may partially take part in polymerization to form long chain branches but preferably provides at least some unsaturated bonds suitable for subsequent curing or vulcanization in post polymerization processes. Examples of EP or EPDM copolymers include V722, V3708P, MDV 91-9, V878 that are available under the trade name Vistalon from ExxonMobil Chemicals. Several commercial EPDM are available from DOW under the trade Nordel IP amd MG grades.). Certain rubber components (e.g., EPDMs, such as Vistalon 3666) include additive oil that is preblended before the rubber component is combined with the thermoplastic. The type of additive oil utilized will be that customarily used in conjunction with a particular rubber component.

Examples of the optional polyene include, but are not limited to, butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyltetrahydroindene; dicyclopentadiene; bicyclo(2.2.1)hepta-2,5-diene; and alkenyl-, alkylidene-, cycloalkenyl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinylcyclooctene, 4-vinylcyclohexene, allyl cyclodecene, vinylcyclododecene, and tetracyclododecadiene.

In another embodiment, the secondary elastomeric component can include, but is not limited to, styrene/butadiene rubber (SBR), styrene/isoprene rubber (SIR), styrene/isoprene/butadiene rubber (SIBR), styrene-butadiene-styrene block copolymer (SBS), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP), hydrogenated styrene-isoprene-styrene block copolymer (SEPS), styrene-ethylene/butylene-ethylene block copolymer (SEBE), styrene-ethylene-styrene block copolymer (SES), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), ethylene-ethylene/butylene-ethylene block copolymer (EEBE), polyisoprene rubber, polybutadiene rubber, isoprene butadiene rubber (IBR), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-alkylstyrene), preferably isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof. Preferred secondary elastomeric components include hydrogenated styrene-butadiene-styrene block copolymer (SEBS), and hydrogenated styrene-isoprene-styrene block copolymer (SEPS).

The secondary elastomeric component can also be or include natural rubber. Natural rubbers are described in detail by Subramaniam in RUBBER TECHNOLOGY 179-208 (1995). Suitable natural rubbers can be selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

The secondary elastomeric component can also be or include one or more synthetic rubbers. One suitable commercially available synthetic rubber include NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE™ 1207.

The secondary elastomeric component can be present in a range from up to 50 phr in one embodiment, from up to 40 phr in another embodiment, and from up to 30 phr in yet another embodiment. In one or more embodiments, the amount of the secondary rubber component can range from a low of about 1, 7, or 20 phr to a high of about 25, 35, or 50 phr.

Additive Oil

The elastomeric composition can optionally include one or more additive oils. The term "additive oil" includes both "process oils" and "extender oils." For example, "additive oil" may include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include mineral oil, alpha olefinic synthetic oils, such as liquid polybutylene, e.g., products sold under the trademark Parapol®. Additive oils other than petroleum based oils can also be used, such as oils derived from coal tar and pine tar, as well as synthetic oils, e.g., polyolefin materials (e.g., SpectaSyn™ and Elevast™, both supplied by ExxonMobil Chemical Company.

The ordinarily skilled chemist will recognize which type of oil should be used with a particular rubber, and also be able to determine the amount (quantity) of oil. The additive oil can be present in amounts from about 5 to about 300 parts by weight per 100 parts by weight of the blend of the rubber and thermoplastic components. The amount of additive oil may also be expressed as from about 30 to 250 parts, and more desirably from about 70 to 200 parts by weight per 100 parts by weight of the rubber component. Alternatively, the quantity of additive oil can be based on the total rubber content, and defined as the ratio, by weight, of additive oil to total rubber and that amount may in certain cases be the combined amount of process oil and extender oil. The ratio may range, for example, from about 0 to about 4.0/1. Other ranges, having any of the following lower and upper limits, may also be utilized: a lower limit of 0.1/1, or 0.6/1, or 0.8/1, or 1.0/1, or 1.2/1, or 1.5/1, or 1.8/1, or 2.0/1, or 2.5/1; and an upper limit (which may be combined with any of the foregoing lower limits) of 4.0/1, or 3.8/1, or 3.5/1, or 3.2/1, or 3.0/1, or 2.8/1. Larger amounts of additive oil can be used, although the deficit is often reduced physical strength of the composition, or oil weeping, or both.

Polybutene oils are preferred. Preferable polybutene oils have an Mn of less than 15,000, and include homopolymer or copolymer of olefin derived units having from 3 to 8 carbon atoms and more preferably from 4 to 6 carbon atoms. In one or more embodiments, the polybutene is a homopolymer or copolymer of a $C_4$ raffinate. An embodiment of preferred low molecular weight polymers termed "polybutene" polymers is described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999) (hereinafter "polybutene processing oil" or "polybutene").

In one or more embodiments, the polybutene processing oil is a copolymer having at least isobutylene derived units, and optionally 1-butene derived units, and/or 2-butene derived units. In one embodiment, the polybutene is a homopolymer if isobutylene, or a copolymer of isobutylene and 1-butene or 2-butene, or a terpolymer of isobutylene and 1-butene and 2-butene, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer. Commercial examples of a suitable processing oil includes the PARAPOL™ Series of processing oils or Polybutene grades or Indopol™ from Soltex Synthetic Oils and Lubricants or from BP/Innovene.

The processing oil or oils can be present at 1 to 60 phr in one embodiment, and from 2 to 40 phr in another embodiment, from 4 to 35 phr in another embodiment, and from 5 to 30 phr in yet another embodiment.

Co-Agents

The elastomeric composition can optionally include one or more co-agents. Suitable co-agents can include liquid and metallic multifunctional acrylates and methacrylates, functionalized polybutadiene resins, functionalized cyanurate, and allyl isocyanurate. More particularly, suitable co-agents can include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate, azobisisobutyronitrile and the like, and combinations thereof. Commercially available co-agents can be purchased from Sartomer.

In one or more embodiments, the elastomeric composition contains at least 0.1 wt % of co-agent based on the total weight of blend. In one or more embodiments, the amount of co-agent(s) can range from about 0.1 wt % to about 15 wt %, based on the total weight of blend. In one or more embodiments, the amount of co-agent(s) can range from a low of about 0.1 wt %, 1.5 wt % or 3.0 wt % to a high of about 4.0 wt %, 7.0 wt %, or 15 wt %, based on the total weight of blend. In one or more embodiments, the amount of co-agent(s) can range from a low of about 2.0 wt %, 3.0 wt % or 5.0 wt % to a high of about 7.0 wt %, 9.5 wt %, or 12.5 wt %, based on the total weight of blend. In one or more embodiments, the amount of co-agent(s) is about 3 wt %, based on the total weight of blend.

Antioxidants

The elastomeric composition can optionally include one or more anti-oxidants. Suitable anti-oxidants can include hindered phenols, phosphites, hindered amines, Irgafos 168, Irganox 1010, Irganox 3790, Irganox B225, Irganxo 1035, Irgafos 126, Irgastab 410, Chimassorb 944, etc. made by Ciba Geigy Corp. These may be added to the elastomeric composition to protect against degradation during shaping or fabrication operation and/or to better control the extent of chain degradation.

In one or more embodiments, the elastomeric composition contains at least 0.1 wt % of antioxidant, based on the total weight of blend. In one or more embodiments, the amount of antioxidant(s) can range from about 0.1 wt % to about 5 wt %, based on the total weight of blend. In one or more embodiments, the amount of antioxidant(s) can range from a low of about 0.1 wt %, 0.2 wt % or 0.3 wt % to a high of about 1 wt %, 2.5 wt %, or 5 wt %, based on the total weight of blend. In one or more embodiments, the amount of antioxidant(s) is about 0.1 wt %, based on the total weight of blend. In one or more embodiments, the amount of antioxidant(s) is about 0.2 wt %, based on the total weight of blend. In one or more embodiments, the amount of antioxidant(s) is about 0.3 wt %, based on the total weight of blend. In one or more embodiments, the amount of antioxidant(s) is about 0.4 wt %, based on the total weight of blend. In one or more embodiments, the amount of antioxidant(s) is about 0.5 wt %, based on the total weight of blend.

Blending and Additives

In one or more embodiments, the individual materials and components, such as the propylene-based polymer and optionally the one or more polyolefinic thermoplastic resins, secondary elastomeric component, additive oil, co-agents, and anti-oxidants can be blended by melt-mixing to form a blend. Examples of machinery capable of generating the shear and mixing include extruders with kneaders or mixing elements with one or more mixing tips or flights, extruders with one or more screws, extruders of co or counter rotating type, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (<3000 RPM).

In one or more embodiments, the blend can include the propylene-based polymer in an amount ranging from a low of about 60, 70 or 75 wt % to a high of about 80, 90, or 95 wt %. In one or more embodiments, the blend can include the one or more polyolefinic thermoplastic components in an amount ranging from a low of about 5, 10 or 20 wt % to a high of about 25, 30, or 75 wt %. In one or more embodiments, the blend can include the secondary elastomeric component in an amount ranging from a low of about 5, 10 or 15 wt % to a high of about 20, 35, or 50 wt %.

In one or more embodiments, the co-agents, antioxidants, and/or other additives can be introduced at the same time as the other polymer components or later downstream in case of using an extruder or Buss kneader or only later in time. In addition to the co-agents and antioxidants described, other additives can include antiblocking agents, antistatic agents, ultraviolet stabilizers, foaming agents, and processing aids. The additives can be added to the blend in pure form or in master batches.

Cured Products

The formed article (e.g., extruded article) can be a fiber, yarn or film, and is at least partially crosslinked or cured. Preferably, the formed article is at least partially crosslinked or cured so that the article becomes heat-resistant. As used herein, the term "heat-resistant" refers to the ability of a polymer composition or an article formed from a polymer composition to pass the high temperature heat-setting and dyeing tests described herein. As used herein, the terms "cured," "crosslinked," "at least partially cured," and "at least partially crosslinked" refer to a composition having at least 2 wt % insolubles based on the total weight of the composition. In one or more embodiments, the compositions described herein can be cured to a degree so as to provide at least 3 wt %, or at least 5 wt %, or at least 10 wt %, or at least 20 wt %, or at least 35 wt %, or at least 45 wt %, or at least 65 wt %, or at least 75 wt %, or at least 85 wt %, or less than 95 wt % insolubles using Xylene as the solvent by Soxhlet extraction.

In a particular embodiment, the crosslinking is accomplished by electron beam or simply "ebeam" after shaping or extruding the article. Suitable ebeam equipment is available from E-BEAM Services, Inc. In a particular embodiment, electrons are employed at a dosage of about 100 kGy or less in multiple exposures. The source can be any electron beam generator operating in a range of about 150 Key to about 12 mega-electron volts (MeV) with a power output capable of supplying the desired dosage. The electron voltage can be adjusted to appropriate levels which may be, for example, 100,000; 300,000; 1,000,000; 2,000,000; 3,000,000; 6,000,000. A wide range of apparatus for irradiating polymers and polymeric articles is available.

Effective irradiation is generally carried out at a dosage between about 10 kGy (Kilogray) to about 350 kGy, preferably from about 20 to about 350 kGy, or from about 30 to about 250 kGy, or from about 40 to about 200 kGy. In a particular aspect of this embodiment, the irradiation is carried out at room temperature.

In another embodiment, crosslinking can be accomplished by exposure to one or more chemical agents in addition to the e-beam cure. Illustrative chemical agents include but are not limited to peroxides and other free radical generating agents, sulfur compounds, phenolic resins, and silicon hydrides. In a particular aspect of this embodiment, the crosslinking agent is either a fluid or is converted to a fluid such that it can be applied uniformly to the article. Fluid crosslinking agents include those compounds which are gases (e.g., sulfur dichloride), liquids (e.g., Trigonox C, available from Akzo Nobel), solutions (e.g., dicumyl peroxide in acetone, or suspensions thereof (e.g., a suspension or emulsion of dicumyl peroxide in water, or redox systems based on peroxides).

Illustrative peroxides include, but are not limited to dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate. When used, peroxide curatives are generally selected from organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5 dimethyl 2,5-di(t-butylperoxy)hexane, 1,1-di(t-butylperoxy)-3,3,5-trimethyl cyclohexane, -butyl-4,4-bis(tert-butylperoxy)valerate, benzoyl peroxide, lauroyl peroxide, dilauroyl peroxide, 2,5-dimethyl-2,5-di(tert-butylperoxy)hexene-3, and mixtures thereof. Also, diaryl peroxides, ketone peroxides, peroxydicarbonates, peroxyesters, dialkyl peroxides, hydroperoxides, peroxyketals and mixtures thereof may be used.

In one or more embodiments, the crosslinking can be carried out using hydrosilylation techniques.

In one or more embodiments, the crosslinking can be carried out under an inert or oxygen-limited atmosphere. Suitable atmospheres can be provided by the use of helium, argon, nitrogen, carbon dioxide, xenon and/or a vacuum.

Crosslinking either by chemical agents or by irradiation can be promoted with a crosslinking catalyst, such as organic bases, carboxylic acids, and organometallic compounds including organic titanates and complexes or carboxylates of lead, cobalt, iron, nickel, zinc, and tin (such as dibutyltindilaurate, dioctyltinmaleate, dibutyltindiacetate, dibutyltindioctoate, stannous acetate, stannous octoate, lead naphthenate, zinc caprylate, cobalt naphthenate, and the like).

EXAMPLES

The foregoing discussion can be further described with reference to the following non-limiting examples. Elastomeric compositions containing at least one propylene-based copolymer in accordance with one or more embodiments described were prepared.

Tables 1 summarize the formulations of the compositions. Each composition was prepared in a Brabender thermoplastic compounder. The pellets of the copolymer with the thermoplastic component were charged into the Brabender in the presence of a nitrogen blanket along with the antioxidants at a melt temperature of 170° C. for 3 minutes. The temperature was then lowered to 140° C. and the co-agent was added and mixed for about 2 minutes at 40 rpm to obtain a homogenous blend. The blends were then molded into 2 mm thick pads with 12 cm×14 cm dimensions on a compression molding press.

TABLE 1

Formulations in weight percent

| Blend | PCP-01 | PCP-02 | PP 5341 | PP 9122 | PP 9632E1 | PB 0110M | TAC | Sartomer 350 | Irganox B225 | Irganox 1035 | Irgafos 126 | Irgafos 168 | Irgastab FS 410 | Rheine Chemie TAIC | NTX 10316 | MDV 91-9 | JSR RB840 |
|---|---|---|---|---|---|---|---|---|---|---|---|---|---|---|---|---|---|
| 1 | 95 | | 5 | | | | | | | | | | | | | | |
| 2 | 95 | | | 5 | | | | | | | | | | | | | |
| 3 | 92 | | 5 | | | | 3 | | | | | | | | | | |
| 4 | 90 | | 5 | | | | 5 | | | | | | | | | | |
| 5 | 88 | | 5 | | | | 7 | | | | | | | | | | |
| 6 | 90 | | 5 | | | | | 5 | | | | | | | | | |
| 7 | 92 | | | 5 | | | | 3 | | | | | | | | | |
| 8 | 94.8 | | 5 | | | | | | 0.2 | | | | | | | | |
| 9 | 94.8 | | 5 | | | | | | | 0.1 | 0.1 | | | | | | |
| 10 | 94.8 | | 5 | | | | | | | | | | 0.2 | | | | |
| 11 | | 94.8 | 5 | | | | | | | | | | 0.2 | | | | |
| 12 | 94.8 | | 5 | | | | | | | | | 0.2 | | | | | |
| 13 | | 91.8 | 5 | | | | 3 | | | | | | 0.2 | | | | |
| 14 | 89.8 | | 5 | | | | | 5 | | | | | 0.2 | | | | |
| 15 | | 91.8 | | 5 | | | 3 | | | | | | 0.2 | | | | |
| 16 | | 91.8 | | 5 | | | | 3 | | | | | 0.2 | | | | |
| 17 | 91.8 | | 5 | | | | 3 | | | | | | 0.2 | | | | |
| 18 | 89.8 | | | 5 | | | 5 | | | | | | 0.2 | | | | |
| 19 | 91.8 | | | 5 | | | 3 | | | | | | 0.2 | | | | |
| 20 | 91.8 | | 5 | | | | | 3 | | | | | 0.2 | | | | |
| 21 | | 91.8 | 5 | | | | | 3 | | | | | 0.2 | | | | |
| 22 | | 91.8 | 5 | | | | | 3 | | | | | 0.2 | | | | |
| 23 | 91.8 | | | | 5 | | | 3 | | | | | 0.2 | | | | |
| 24 | | 91.8 | | 5 | | | | 3 | | | | | 0.2 | | | | |
| 25 | | 91.8 | | 5 | | | | 3 | | | | | 0.2 | | | | |
| 26 | | 86.8 | | 10 | | | | 3 | | | | | 0.2 | | | | |
| 27 | | 92.2 | 4.8 | | | | | | | | | | | 3.0 | | | |
| 28 | | 92.2 | 4.8 | | | | | | | | | | | | 3.0 | | |
| 29 | | 85.5 | 4.5 | | | | | | | | | | | | | 10.0 | |
| 30 | | 82.7 | 4.3 | | | | | 3 | | | | | | | | 10.0 | |
| 31 | | 90.0 | | | | | | | | | | | | | | | 10.0 |
| 32 | | 85.5 | 4.5 | | | | | | | | | | | | | | 10.0 |
| 33 | | 95.0 | | | 5 | | | | | | | | | | | | |
| 34 | | 92.2 | | | 4.8 | | | 3 | | | | | | | | | |

PCP-01 is a metallocene catalyzed propylene/ethylene copolymer having 16 wt % of ethylene and 2.5 wt % ENB. The melting point was less than 50° C. The Mooney viscosity (ML (1 + 4) at 125° C.) was 17.5 as measured according to a method based on ASTM D 1646. The MFR (2.16 kg at 230° C.) was 4 g/10 min.

PCP-02 is a metallocene catalyzed propylene/ethylene copolymer having 16 wt % of ethylene and 2.4 wt % ENB. The melting point was less than 100° C. The Mooney viscosity (ML (1 + 4) at 125° C.) was 18.3 as measured according to a method based on ASTM D 1646. The MFR (2.16 kg at 230° C.) was 3.7 g/10 min.

PP 5341 is a 0.8 MFR (230° C., 2.16 kg) isotactic polypropylene (iPP) that is commercially available from ExxonMobil Chemical Company.

RCP 9632E1 is a random copolymer containing 2-3 wt % of ethylene derived units, the balance is propylene. The RCP 9632E1 has a MFR (2.16 kg at 230° C.) of 2.5 g/10 min and a density of 0.9 g/cm³. The 1% secant flexural modulus is 155 kPsi, as measured by ASTM D790A. RCP 9632E1 is commercially available from ExxonMobil Chemical Company.

RCP 9122 is a random copolymer containing 2-3 wt % of ethylene derived units, the balance is propylene. The RCP 9122 has a MFR (2.16 kg at 230° C.) of 2.1 g/10 min and a density of 0.9 g/cm³. The 1% secant flexural modulus is 140 kPsi, as measured by ASTM D790A. RCP 9122 is commercially available from ExxonMobil Chemical Company.

TAC is tri-allyl cyanurate.

Sartomer 350 is a trimethylolpropane trimethacrylate co-agent that is commercially available from Sartomer Company, Inc. located in Exton, Pennsylvania.

Irgastab FS 410 and Irgafos 168 are antioxidants that are commercially available from Ciba Specialty Chemicals.

TAIC is triallylisocyanurate, b.p. 149-152° C./4 mmHg (500 ppm t-butylhydroquinone as inhibitor) (Rhein Chemie).

NTX 10316 is an allylurethane oligomer (Sartomer Co.).

RB840 is syndiotatic 1,2-Polybutadiene m.p. 130° C., MFR (150° C., 21.2 N): 8.0 (JSR America)

PB0110M is isotactic poly(1-butene) m.p. 125° C., MFR (230° C., 2.16 kg): 1.0 (Basell Polyolefins).

MDV 91-9 is an EP copolymer (ExxonMobil Chemical) with about 60 wt % ethylene and has a Mooney viscosity (ML (1 + 4) at 125° C.) about 19 and narrow molecular weight distribution.

The plaques were then crosslinked using electron beam radiation for various periods of time at room temperature. The selected dosages were 50, 75, 100 and 150 kGy. The MFR of the blends were tested at 230° C. using 2.16 kg load.

Physical properties of the plaques before and after curing were evaluated. The test methods included ISO 878 for Hardness, ISO 37 for ultimate tensile strength (UTS) and ultimate elongation (UE), and ASTM D412 standard guidelines. The tension set of the blends were tested according to ASTM D412 at room temperature and 70 C. For room temperature and 70 C testing for tension set the sample was aged at the test temperature for 30 minutes under 50% tension on Jig and annealed at room temperature for 30 minute after removing from the Jig. A xylene Soxhlet solvent extraction test was conducted according to ASTM D5492 on the cured samples using a Soxhlet extractor (extraction time=12 hrs) to understand the level of crosslinked material after e-beam curing. Results are expressed as: percent Xylene insoluble=weight after extraction/weight before extraction*100. The amount of insoluble gel before e-beam radiation crosslinking was practically undetectable by this method.

Table 2 summarizes the physical properties of the plaques prior to e-beam cure. Table 3 summarizes the e-beam dosage and physical properties of the plaques after curing.

TABLE 2

Mechanical properties of the uncured plaques.

| Blend | Hardness, Shore A, 15s. | MFR (230° C., 2.16 kg) | Stress at break, MPa | Strain at Break, % | Peak stress, (MPa) | Peak Elongation, (%) | 100% Mod. (MPa) | Tension Set, (%) at 23° C. | Tension Set, (%) at 70° C. |
|---|---|---|---|---|---|---|---|---|---|
| 1 | 57.0 | 4.2 | — | no break | 11.1 | — | 1.9 | 5% | 51% |
| 2 | 57.4 | 4.0 | — | no break | 10.9 | — | 1.9 | 5% | 49% |
| 3 | 53.2 | 5.3 | — | no break | 9.7 | — | 1.7 | 6% | 49% |
| 4 | 52.8 | 6.2 | — | no break | 9.6 | — | 1.7 | 5% | 49% |
| 5 | 52.8 | 8.9 | — | no break | 9.1 | — | 1.7 | 6% | 49% |
| 6 | 52.8 | 0.83 | — | no break | 10.5 | — | 1.6 | 8% | 45% |
| 7 | 58.4 | 0.4 | — | NA | 11.0 | 840 | 1.7 | NA | NA |
| 8 | 55.2 | 3.9 | 10.1 | 780 | — | — | 1.9 | 6% | 49% |
| 9 | 55.6 | 3.8 | — | no break | 10.8 | — | 1.8 | 4% | 48% |
| 10 | 55.6 | 4.5 | — | no break | 10.7 | — | 1.8 | 6% | 49% |
| 11 | 57 | 3.9 | 10.5 | 821 | 10.6 | 820 | 1.6 | NA | NA |
| 12 | 58 | 3.7 | — | no break | 10.9 | — | 1.8 | 6% | 49% |
| 13 | 56 | NA | — | — | 10.3 | 836 | 1.6 | NA | NA |
| 14 | 54 | 6.6 | — | no break | 9.1 | — | 1.6 | 6% | 49% |
| 15 | 55.2 | 6.3 | — | — | 8.7 | 840 | 1.6 | — | — |
| 16 | 57.4 | 2.2 | — | — | 9.6 | 840 | 1.7 | — | — |
| 17 | 53.4 | 5.3 | — | — | 8.6 | 840 | 1.5 | — | — |
| 18 | 54.2 | 6.1 | — | no break | 9.2 | — | 1.7 | 6% | 47% |
| 19 | 56.4 | 6.1 | — | — | 8.7 | 840 | 1.6 | — | — |
| 20 | 54.2 | 4.7 | — | — | 8.6 | 840 | 1.5 | — | — |
| 21 | 54 | 4.27 | 9.7 | 843 | 10.2 | 840 | 1.5 | — | — |
| 22 | 57.6 | 4.76 | — | — | 10.9 | 800 | 1.8 | — | — |
| 23 | 57.4 | 3 | — | — | 9.7 | 820 | 1.7 | — | — |
| 24 | 55 | 4.31 | 10.3 | 841 | 10.3 | 820 | 1.6 | — | — |
| 25 | 59.6 | 4.64 | — | — | 11.3 | 840 | 1.8 | — | — |
| 26 | 63 | 4.58 | 11.5 | 838 | 13.2 | 820 | 2.0 | — | — |
| 27 | 55 | — | 15.7 | 920 | — | — | 2.1 | 2.5 | broke |
| 28 | 63 | — | 13.2 | 870 | — | — | 1.8 | 1.3 | 46.3 |
| 29 | 64 | — | 13.1 | 860 | — | — | 1.7 | 2.5 | 43.8 |
| 30 | 63 | — | 13.9 | 910 | — | — | 1.7 | 2.5 | 43.8 |
| 31 | 65 | — | 11.8 | 860 | — | — | 1.9 | 2.5 | 53.8 |
| 32 | 68 | — | 12.4 | 800 | — | — | 2.1 | 2.5 | 46.3 |
| 33 | 64 | — | 12.4 | 810 | — | — | 1.8 | 2.5 | broke |
| 34 | 58 | — | 15.2 | 870 | — | — | 1.7 | 2.5 | broke |

TABLE 3

Mechanical properties of the cured plaques.

| Blend | e-beam dose, kGy | Stress at break, MPa | Strain at Break, % | Peak stress, (MPa) | Peak Elongation (%) | 100% Mod. (MPa) | Tension Set, TS (%), 23° C. | Tension Set, TS (%), 70° C. | Xylene Extraction (%) insolubles |
|---|---|---|---|---|---|---|---|---|---|
| 1 | 50 | 8.4 | 706 | — | — | 1.9 | 5% | 29% | 67 |
| 2 | 50 | 9.6 | 733 | — | — | 1.9 | 4% | 29% | 73 |
| 3 | 50 | — | no break | 9.9 | — | 1.7 | 4% | 38% | 39 |
| 4 | 50 | — | no break | 9.4 | — | 1.6 | 4% | 39% | 39 |
| 5 | 50 | — | no break | 9.2 | — | 1.5 | 9% | 39% | 40 |
| 6 | 50 | — | 525 | 9.1 | — | 2.2 | 5% | 19% | 83 |
| 7 | 50 | 9.6 | 617 | — | — | 2.2 | 5.5 | 25.3 | 70.1 |
| 8 | 50 | 8.7 | 769 | — | — | 1.8 | 5% | 35% | 50 |
| 9 | 50 | 10.9 | 790 | — | — | 1.8 | 4% | 32% | 63 |
| 10 | 50 | 11.3 | 785 | — | — | 1.8 | 5% | 31% | 66 |
| 11 | 50 | 11.5 | 792 | 11.4 | 780 | 2.0 | 4 | 27 | 73 |
| 12 | 50 | 10.4 | 781 | — | — | 1.8 | 5% | 30% | 66 |
| 13 | 60 | 10.1 | 635 | 10.1 | 640 | 2.0 | NA | NA | NA |
| 14 | 50 | 9.1 | 868 | — | — | 1.5 | 4% | 39% | 47 |
| 15 | 50 | — | — | 9.8 | 840 | 1.8 | 6.0 | 40.0 | 14.4 |
| 16 | 50 | 11.3 | 658 | — | — | 2.1 | 4.5 | 23.5 | 72.6 |
| 17 | 50 | — | — | 9.5 | 840 | 1.6 | 4.8 | 39.3 | 19.5 |
| 18 | 50 | — | no break | 10.2 | — | 1.6 | 5% | 40% | 48 |
| 19 | 50 | — | — | 9.6 | 840 | 1.8 | 6.0 | 39.0 | 18.5 |
| 20 | 50 | 11.6 | 614 | — | — | 1.9 | 5.3 | 21.5 | 82.3 |
| 21 | 50 | 11.8 | 700 | 11.8 | 640 | 2.1 | 4 | 20 | 83 |
| 22 | 50 | 12.8 | 680 | 12.8 | 660 | 2.2 | 3 | 18 | 83 |
| 23 | 50 | 11.8 | 659 | — | — | 2.1 | 5.3 | 24.3 | 68 |
| 24 | 50 | 12.6 | 717 | 12.7 | 700 | 2.2 | 3 | 22 | 84 |
| 25 | 50 | 13 | 712 | 13 | 660 | 2.3 | 4 | 20 | 86 |
| 26 | 50 | 12.5 | 664 | 12.5 | 600 | 2.6 | 3 | 23 | 86 |
| 27 | 50 | 10.3 | 670 | — | — | 2.2 | 2.5 | 25 | 68 |

TABLE 3-continued

Mechanical properties of the cured plaques.

| Blend | e-beam dose, kGy | Stress at break, MPa | Strain at Break, % | Peak stress, (MPa) | Peak Elongation (%) | 100% Mod. (MPa) | Tension Set, TS (%), 23° C. | Tension Set, TS (%), 70° C. | Xylene Extraction (%) insolubles |
|---|---|---|---|---|---|---|---|---|---|
| 28 | 50 | 12.8 | 800 | — | — | 2.2 | 2.5 | 27.5 | 71 |
| 29 | 50 | 12.8 | 780 | — | — | 2.0 | 2.5 | 27.5 | 71 |
| 30 | 50 | 11.9 | 660 | — | — | 2.2 | 2.5 | 20 | 84 |
| 31 | 50 | 13.3 | 760 | — | — | 2.2 | 2.5 | 25 | 73 |
| 32 | 50 | 12.7 | 710 | — | — | 2.3 | 2.5 | 26.3 | 79 |
| 33 | 50 | 13.6 | 780 | — | — | 1.9 | 2.5 | 21.3 | 76 |
| 34 | 50 | 13.7 | 650 | — | — | 2.0 | 2.5 | 12.5 | 86 |

It was surprisingly found that the blends containing Irgastab FS410, TAC, Sartomer 350 and Irganox 168 showed increased tensile properties after e-beam (50 kGy) crosslinking, where the blends containing no co-agents or antioxidants showed a decrease in tensile properties after e-beaming. It is also surprisingly noted that blends containing the co-agent Sartomer 350 or TAC with antioxidants Irganox 168 or Irgastab FS 410 increased tensile properties after e-beam (50 kGy) crosslinking. Such addition of co-agents and/or antioxidants would not have been thought to overcome the reduction in tensile properties resulting from the e-beam breakdown, chain scission of the propylene copolymer backbone.

Fiber properties of selected blends were also evaluated. Blends 1, 11, 21, and 24 were selected based on their excellent balance of physical properties. To test the physical properties of the fibers, the selected blends were spun into fiber using a partially oriented yarn line having a L:D ratio of 24:1. The spinnerette had 72 holes. Each hole had a diameter of 0.6 mm. The output of the line ranged from about 0.4 to 2 gram/hole/min, with a Godet speed close to 5,000 m/min and a winding speed of from 100 m/min to 3,000 m/min The extruded fibers were cooled by quenched air having a temperature of about 45° F. to 55° F.

Table 4 summarizes the physical properties of both the cured and uncured fibers. As shown below, the cured fibers exhibited excellent spinnability and fiber formation.

TABLE 4

Fiber Properties

| Blend | Winder speed, m/min | ghm | Melt T, F. | Ebeam dosage, megaRAD | Count, den (72 filaments) | Tenacity, g/den | Elong., % | Xylene insoluble, % | TS, % at 23 C. | TS, % at 70 C. |
|---|---|---|---|---|---|---|---|---|---|---|
| 1 | 300 | 0.6 | 519 | 0 | 1260 | 0.57 | 195 |  | 4 | 21 |
| 1 | 300 | 0.6 | 519 | 5 | 1260 | 0.46 | 171 | 37 | NA | NA |
| 1 | 400 | 0.6 | 519 | 0 | 1350 | 0.57 | 170 |  | 2.5 | 13 |
| 1 | 400 | 0.6 | 519 | 5 | 1350 | NA | NA | 31 | 1 | 24 |
| 21 | 260 | 0.6 | 519 | 0 | 1650 | 0.36 | 157 |  | 5 | 20 |
| 21 | 260 | 0.6 | 519 | 5 | 1566 | 0.35 | 166 | 55 | 0.5 | 14 |
| 21 | 260 | 0.6 | 519 | 0 | 1583 | 0.31 | 161 |  | 0.5 | 22 |
| 21 | 260 | 0.6 | 519 | 6 | 1520 | 0.32 | 146 | 58 | 1 | 14 |
| 21 | 145 | 0.6 | 519 | 0 | 2939 | 0.23 | 166 |  | 0.5 | 25 |
| 21 | 145 | 0.6 | 519 | 5 | 2849 | 0.22 | 158 | 60 | 0.5 | 20 |
| 21 | 145 | 0.6 | 519 | 0 | 2887 | 0.25 | 176 |  | 0.5 | 22 |
| 21 | 145 | 0.6 | 519 | 6 | 2857 | 0.21 | 156 | 64 | 4 | 13 |
| 11 | 260 | 0.6 | 519 | 0 | 1416 | 0.42 | 170 |  | 0.5 | 19 |
| 11 | 260 | 0.6 | 519 | 4 | 1416 | 0.33 | 143 | 44 | 3.5 | 35 |
| 11 | 260 | 0.6 | 519 | 0 | 1360 | 0.4 | 158 |  | 5 | 25 |
| 11 | 260 | 0.6 | 519 | 5 | 1068 | 0.3 | 119 | 45 | 1 | 12.5 |
| 11 | 260 | 0.6 | 519 | 0 | 1030 | 0.49 | 102 |  | 2 | 25 |
| 11 | 260 | 0.6 | 519 | 6 | 1030 | 0.39 | 171 | 46 | 1 | 10 |
| 11 | 130 | 0.6 | 519 | 0 | 2690 | 0.68 | 143 |  | 2 | 24 |
| 11 | 130 | 0.6 | 519 | 5 | 2690 | 0.76 | 151 | 52 | 0.5 | 19 |
| 24 | 250 | 0.6 | 519 | 0 | 1260 | 0.32 | 122 |  | 5 | 17 |
| 24 | 250 | 0.6 | 519 | 4 | 1260 | NA | NA | 43 | 0.5 | 15 |
| 24 | 250 | 0.6 | 519 | 0 | 1180 | 0.33 | 146 |  | 3 | 18 |
| 24 | 250 | 0.6 | 519 | 5 | 1280 | 0.43 | 167 | 58 | 2 | 10 |
| 24 | 250 | 0.6 | 519 | 0 | 1040 | 0.36 | 147 |  | 2 | 15 |
| 24 | 250 | 0.6 | 519 | 6 | 1020 | 0.37 | 162 | 61 | 4 | 7 |
| 24 | 300 | 0.6 | 519 | 0 | 750 | 0.42 | 166 |  | 2.5 | 10 |
| 24 | 300 | 0.6 | 519 | 5 | 800 | 0.53 | 103 | 57 | 7 | 5 |

Monolayer films from blends 1, 11, 21 and 24 were also prepared. The films were made by compression molding, similar to the process used for making the plaques. The thickness of each film was about 10 mil.

The results are shown below in Tables 5 and 6. Table 5 summarizes the physical properties of the films before e-beam cure and Table 6 summarizes the physical properties of the films after e-beam cure using a dosage of 50 kGy.

TABLE 5

Film Properties before cure

| | Blend | | | |
|---|---|---|---|---|
| | 1 | 11 | 24 | 21 |
| Stress at Break, psi | 1437 | 1253 | 1910 | 1602 |
| Elongation at break, (%) | 1393 | 1298 | 1624 | 1530 |
| 100% Mod, MPa | 247 | 245 | 252 | 231 |
| Energy at Break, in * lbf | 12.6 | 11.2 | 19.6 | 15.3 |

TABLE 6

Film Properties after e-beam curing at 50 kGy dose

| | Blend | | | |
|---|---|---|---|---|
| | 1 | 11 | 24 | 21 |
| Stress at Break, psi | 1724 | 1787 | 1916 | 1317 |
| Elongation at break, (%) | 1457 | 1614 | 1423 | 1165 |
| 100% Mod, psi | 267 | 255 | 277 | 262 |
| Energy at Break, in * lbf | 15.9 | 20.0 | 16.9 | 10.3 |
| Xylene Extraction, % insolubles | 53 | 56 | 62 | 67 |

It was surprisingly found that the ebeam cured films maintained their tensile strength after curing even at such high levels (i.e. >50%) of crosslinking as measured by the xylene extraction, percent insolubles. The opposite would have been expected considering the strength properties of cured films are usually sacrificed during crosslinking.

For purposes of convenience, various specific test procedures are identified above for determining certain properties such as tensile set, percent elongation at break, Shore A Hardness, and toughness. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims. All numerical values can be considered to be "about" or "approximately" the stated value, in view of the nature of testing in general.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

Having described the various aspects of the compositions herein, described in various numbered embodiments is:

1. A crosslinked elastomeric composition, comprising at least one propylene-based polymer comprising propylene derived units and one or more dienes, the propylene-based polymer having a triad tacticity of from 50% to 99% and a heat of fusion of less than 80 J/g; at least one component selected from the group consisting of multifunctional acrylates, multifunctional methacrylates, functionalized polybutadiene resins, functionalized cyanurate, and allyl isocyanurate; at least one component comprising trimethylolpropane trimethacrylate; one or more polyolefinic thermoplastic components; and optionally one or more secondary elastomeric components, wherein the crosslinked polypropylene has great than 50% xylene insolubles as measured according to ASTM-D 5492.

2. A method for making a crosslinked elastomeric article of numbered embodiment 1, comprising blending an elastomeric composition comprising the at least one propylene-based polymer comprising propylene derived units and one or more dienes; at least one component selected from the group consisting of multifunctional acrylates, multifunctional methacrylates, functionalized polybutadiene resins, functionalized cyanurate, and allyl isocyanurate; and at least one component selected from the group consisting of hindered phenols, phosphites, and hindered amines; extruding the composition; and crosslinking the extruded polymer using electron beam radiation having an e-beam dose of about 200 kGy or less.

3. The method of numbered embodiments 1 and 2, wherein the e-beam dose is about 100 kGy.

4. The method of any of the previous numbered embodiments, wherein the e-beam dose ranges of from 40 kGy to about 60 kGy.

5. The method of any of the previous numbered embodiments, wherein the blended composition further comprises one or more secondary elastomeric components.

6. The method of any of the previous numbered embodiments, wherein the propylene-based polymer has a heat of fusion from about 1 J/g to about 70 J/g.

7. The method of any of the previous numbered embodiments, wherein the propylene-based polymer has a melting point of about 100° C. or less.

8. The method of any of the previous numbered embodiments wherein the propylene-based polymer has a triad tacticity from about 60% to about 97%.

9. The method of any of the previous numbered embodiments, wherein the propylene-based polymer further comprises units derived from an alpha-olefin other than the propylene derived units and the one or more dienes in an amount from about 5 wt % to about 40 wt %.

10. The method of numbered embodiment 9, wherein the propylene-based polymer comprises units derived from ethylene, 1-butene, 1-hexene and/or 1-octene.

11. The method of numbered embodiment 9, wherein the propylene-based polymer comprises from about 5 wt % to about 40 wt % of units derived from ethylene and/or 1-butene.
12. The method of numbered embodiment 9, wherein the propylene-based polymer comprises from about 5 wt % to about 40 wt % of units derived from ethylene and/or 1-hexene.
13. The method any of the previous numbered embodiments, wherein the propylene-based polymer comprises from 0.2 to 4 wt % 5-ethylidene-2-norbornene (ENB).
14. The method any of the previous numbered embodiments, wherein the extruded article is a fiber, yarn, or film.

What is claimed is:

1. A method for making a crosslinked elastomeric article, comprising:
   (a) forming an elastomeric composition comprising: (i) at least one propylene-based polymer comprising propylene derived units and one or more dienes, the propylene-based polymer having a triad tacticity of from 50% to 99% and a heat of fusion of less than 80 J/g; and (ii) at least one component selected from the group consisting of hindered phenols, phosphites, and hindered amines;
   (b) adding to the elastomeric composition at least one co-agent selected from the group consisting of multifunctional acrylates, and multifunctional methacrylates, functionalized polybutadiene resins, functionalized cyanurate, and allyl isocyanurate;
   (c) blending the elastomeric composition and co-agent to form a homogenous blend and extruding the resulting elastomeric composition blend with an extruder; and
   (d) crosslinking the extruded elastomeric composition using electron beam radiation having an e-beam dose of about 200 kGy or less,
   wherein the co-agent is added to the extruder downstream of the elastomeric composition.

2. The method of claim 1, wherein the e-beam dose is about 100 kGy.
3. The method of claim 1, wherein the e-beam dose ranges of from 40 kGy to about 60 kGy.
4. The method of claim 1, wherein the composition in step (a) further comprises one or more secondary elastomeric components.
5. The method of claim 1, wherein the propylene-based polymer has a heat of fusion from about 1 J/g to about 70 J/g.
6. The method of claim 1, wherein the propylene-based polymer has a melting point of about 100° C. or less.
7. The method of claim 1, wherein the propylene-based polymer has a triad tacticity from about 60% to about 97%.
8. The method of claim 1, wherein the propylene-based polymer further comprises alpha-olefin units other than the propylene derived units and the one or more dienes in an amount from about 5 wt % to about 40 wt %.
9. The method of claim 8, wherein the propylene-based polymer comprises ethylene, butene, hexene, and/or octene units.
10. The method of claim 9, wherein the propylene-based polymer comprises from about 5 wt % to about 40 wt % of ethylene and/or butene units.
11. The method of claim 9, wherein the propylene-based polymer comprises from about 5 wt % to about 40 wt % of ethylene and/or hexene units.
12. The method of claim 1, wherein the propylene-based polymer comprises from 0.2 to 4 wt % 5-ethylidene-2-norbornene (ENB).
13. The method of claim 1, wherein step (b) further comprises adding at least one component selected from the group consisting of hindered phenols, phosphites, and hindered amines.

* * * * *